(12) United States Patent
Bronstein et al.

(10) Patent No.: US 12,151,967 B2
(45) Date of Patent: Nov. 26, 2024

(54) MATERIAL COMPRISING A SUBSTRATE PROVIDED WITH A STACK WITH THERMAL PROPERTIES FOR HEAD-UP DISPLAY

(71) Applicant: SAINT-GOBAIN GLASS FRANCE, Courbevoie (FR)

(72) Inventors: Yael Bronstein, Paris (FR); Amaury Patissier, Bourg-la-Reine (FR); Xavier Caillet, Fontenay-sous-Bois (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 487 days.

(21) Appl. No.: 17/630,444

(22) PCT Filed: Jul. 28, 2020

(86) PCT No.: PCT/EP2020/071192
§ 371 (c)(1),
(2) Date: Jan. 26, 2022

(87) PCT Pub. No.: WO2021/018861
PCT Pub. Date: Feb. 4, 2021

(65) Prior Publication Data
US 2022/0250972 A1 Aug. 11, 2022

(30) Foreign Application Priority Data

Jul. 30, 2019 (FR) ..................... 19 08683

(51) Int. Cl.
*B32B 27/02* (2006.01)
*B32B 17/10* (2006.01)
*C03C 17/36* (2006.01)

(52) U.S. Cl.
CPC .... *C03C 17/3626* (2013.01); *B32B 17/10229* (2013.01); *C03C 17/3639* (2013.01);
(Continued)

(58) Field of Classification Search
CPC ............... C03C 17/36; C03C 17/3626; C03C 17/3639; C03C 17/3644; C03C 17/3657;
(Continued)

(56) References Cited

U.S. PATENT DOCUMENTS

2002/0086164 A1 7/2002 Anzaki et al.
2009/0297864 A1 12/2009 Lingle et al.
(Continued)

FOREIGN PATENT DOCUMENTS

FR 2 985 724 A1 7/2013

OTHER PUBLICATIONS

International Search Report issued on Oct. 1, 2020 in PCT/EP2020/071192 filed on Jul. 28, 2020, 2 pages.

*Primary Examiner* — Lawrence D Ferguson
(74) *Attorney, Agent, or Firm* — Oblon, McClelland, Maier & Neustadt, L.L.P.

(57) ABSTRACT

A material includes a transparent substrate coated on one face with a stack of thin layers successively including, from the face, an alternation of four functional metal layers based on silver and five dielectric coatings. The physical thickness Ea1 of the first functional layer Ag1 is less than the physical thickness Ea2 of the second functional layer Ag2, with $0.60<Ea1/Ea2<0.90$. The physical thickness Ea1 of the first functional layer Ag1 is such that $8.00 \leq Ea1 \leq 13.00$ nm. The physical thickness Ea1 of the first functional layer Ag1 is less than the physical thickness Ea3 of the third functional layer Ag3, with $0.60<Ea1/Ea3<0.90$. The physical thickness Ea1 of the first functional layer Ag1 is less than the physical thickness Ea4 of the fourth functional layer Ag4, with $0.60<Ea1/Ea4<0.90$.

20 Claims, 4 Drawing Sheets

(52) U.S. Cl.
CPC ........ *C03C 17/3644* (2013.01); *C03C 17/366* (2013.01); *C03C 17/3681* (2013.01); *B32B 17/10036* (2013.01); *B32B 2307/206* (2013.01); *B32B 2307/412* (2013.01); *B32B 2307/418* (2013.01); *B32B 2605/00* (2013.01)

(58) Field of Classification Search
CPC .............. C03C 17/366; C03C 17/3681; B32B 17/10036; B32B 17/10229; B32B 2307/206; B32B 2307/412; B32B 2307/418; B32B 2605/00
See application file for complete search history.

(56) References Cited

U.S. PATENT DOCUMENTS

| | | |
|---|---|---|
| 2010/0046191 A1 | 2/2010 | Den Boer et al. |
| 2010/0187990 A1 | 7/2010 | Lingle et al. |
| 2011/0169402 A1 | 7/2011 | Lingle et al. |
| 2015/0004383 A1 | 1/2015 | Sandre-Chardonnal |
| 2018/0348513 A1 | 12/2018 | Fischer et al. |

Fig. 2

|  | N° (fig. 1) | Ex 1 | Ex 2 | Ex 3 | Ex 4 |
|---|---|---|---|---|---|
| Eo5 | 180 | 89.9 | 83.8 | 84.9 | 103.3 |
| Ep ($Si_3N_4$) | 187 | 14.0 | 12.8 | 13.0 | 15.7 |
| Ep (SiZrN) | 186 | 17.3 | 15.8 | 16.1 | 19.1 |
| Ep (ZnO) | 182 | 10.0 | 10.0 | 10.0 | 12.9 |
| Ep (NiCr) | 170 | - | - | - | 0.1 |
| Ea4 (Ag4) | 160 | 13.6 | 16.1 | 14.1 | 13.6 |
| Eo4 | 140 | 173.6 | 171.9 | 170.8 | 165.4 |
| Ep (ZnO) | 148 | 10.0 | 10.0 | 10.0 | 10.7 |
| Ep (SnZnO) | 147 | 10.0 | 10.0 | 10.0 | 10.6 |
| Ep (SiZrN) | 146 | 26.1 | 25.7 | 25.4 | 22.1 |
| Ep ($Si_3N_4$) | 144 | 27.7 | 27.3 | 27.1 | 21.8 |
| Ep (ZnO) | 142 | 10.0 | 10.0 | 10.0 | 15.5 |
| Ep (NiCr) | 130 | - | - | - | 0.1 |
| Ea3 (Ag3) | 120 | 14.3 | 14.2 | 14.9 | 14 |
| Eo3 | 100 | 159.0 | 163.9 | 156.0 | 131.9 |
| Ep (ZnO) | 108 | 10.0 | 10.0 | 10.0 | 12.4 |
| Ep (SnZnO) | 107 | 10.0 | 10.0 | 10.0 | 12.3 |
| Ep (SiZrN) | 106 | 22.9 | 24.0 | 22.2 | 15.8 |
| Ep ($Si_3N_4$) | 104 | 24.1 | 25.3 | 23.4 | 13.9 |
| Ep (ZnO) | 102 | 10.0 | 10.0 | 10.0 | 10.4 |
| Ep (NiCr) | 90 | - | - | - | 0.5 |
| Ea2 (Ag2) | 80 | 13.8 | 13.0 | 14.4 | 13.2 |
| Eo2 | 60 | 158.3 | 172.8 | 156.2 | 165.1 |
| Ep (ZnO) | 68 | 10.0 | 10.0 | 10.0 | 11.3 |
| Ep (SnZnO) | 67 | 10.0 | 10.0 | 10.0 | 10.7 |
| Ep (SiZrN*) | 66 | 23.1 | 26.4 | 22.6 | - |
| Ep (SiZrN) | 64 | 20.4 | 23.4 | 20.0 | 40.8 |
| Ep (ZnO) | 62 | 10.0 | 10.0 | 10.0 | 12.8 |
| Ep (NiCr) | 50 | - | - | - | 0.1 |
| Ea1 (Ag1) | 40 | 13.7 | 6.6 | 11.7 | 10.8 |
| Eo1 | 20 | 86.1 | 118.4 | 87.2 | 79.4 |
| Ep (ZnO) | 28 | 10.0 | 10.0 | 10.0 | 9.8 |
| Ep (SnZnO) | 27 | 10.0 | 10.0 | 10.0 | 9.7 |
| Ep (SiZrN) | 24 | 21.4 | 36.1 | 21.9 | 18.8 |

|         | I1              | I2              | I3              | Ex 1 | Ex 2 | Ex 3 | Ex 4 |
|---------|-----------------|-----------------|-----------------|------|------|------|------|
| Ea1/Ea2 | >0.60 & <0.90   | ≥0.70 & ≤0.85   | ≥0.75 & ≤0.85   | 0.99 | 0.51 | 0.81 | 0.82 |
| Ea1/Ea3 | >0.60 & <0.90   | ≥0.70 & ≤0.85   | ≥0.75 & ≤0.85   | 0.96 | 0.46 | 0.79 | 0.77 |
| Ea1/Ea4 | >0.60 & <0.90   | ≥0.70 & ≤0.85   | ≥0.75 & ≤0.85   | 1.01 | 0.41 | 0.83 | 0.79 |
| Eo1/Eo2 | >0.40 & <0.90   | ≥0.45 & ≤0.85   | ≥0.45 & ≤0.80   | 0.54 | 0.69 | 0.56 | 0.48 |
| Eo1/Eo3 | >0.40 & <0.90   | ≥0.45 & ≤0.85   | ≥0.45 & ≤0.80   | 0.54 | 0.72 | 0.56 | 0.60 |
| Eo1/Eo4 | >0.40 & <0.90   | ≥0.45 & ≤0.85   | ≥0.45 & ≤0.80   | 0.50 | 0.69 | 0.51 | 0.48 |
| Eo1/Eo5 | >0.50 & <1.50   | ≥0.60 & ≤1.30   | ≥0.70 & ≤1.1    | 0.96 | 1.41 | 1.03 | 0.77 |
| Ea2/Ea3 | >0.80 & <1.20   | ≥0.90 & ≤1.10   | ≥0.95 & ≤1.05   | 0.97 | 0.92 | 0.97 | 0.94 |
| Ea2/Ea4 | >0.80 & <1.20   | ≥0.90 & ≤1.10   | ≥0.95 & ≤1.05   | 1.01 | 0.81 | 1.02 | 0.97 |
| Ea3/Ea4 | >0.80 & <1.20   | ≥0.90 & ≤1.10   | ≥0.95 & ≤1.05   | 1.05 | 0.88 | 1.06 | 1.03 |

Fig. 4

|              | I1    | Ex 1  | Ex 2  | Ex 3  | Ex 4  |
|--------------|-------|-------|-------|-------|-------|
| R (Ω/□)      | ≤0.70 | 0.69  | 0.80  | 0.70  | 0.67  |
| $T_L$(%)     |       | 73    | 78    | 75    |       |
| $a^*_T$      |       | -5.4  | -7.1  | -5.3  |       |
| $b^*_T$      |       | 7.5   | 12.1  | 5.9   |       |
| $R_c$(%)     |       | 5.9   | 3.9   | 4.6   |       |
| $a^*_{Rc}$   |       | 4.2   | 20.9  | 4.5   |       |
| $b^*_{Rc}$   |       | -16.8 | -35.9 | -13.9 |       |
| $R_g$(%)     |       | 8.2   | 5.1   | 5.9   |       |
| $a^*_{Rg}$   |       | 5.2   | 18.3  | 4.9   |       |
| $b^*_{Rg}$   |       | -16.6 | -35.2 | -15.8 |       |
| $L^*_{Rc}$(60°) |    | 45.7  | 44.4  | 44.7  |       |
| $a^*_{Rc}$ (60°) |   | -2.4  | -1.8  | -3.1  |       |
| $b^*_{Rc}$ (60°) |   | -2.7  | -5.2  | -0.3  |       |

Fig. 5

| | I1 | Ex 1 | Ex 2 | Ex 3 | Ex 4 |
|---|---|---|---|---|---|
| $T_L(\%)$ | ≥70 | 70 | 71 | 71 | 71.4 |
| $a^*_T$ | <0.0 | -4.6 | -6.5 | -4.7 | -4.2 |
| $b^*_T$ | | 8.5 | 11.8 | 7.4 | 7.7 |
| $R_e(\%)$ | ≤15.0 | 9.5 | 11.6 | 0.6 | 9.2 |
| $a^*_{Re}$ | <0.0 | -4.2 | 5.3 | -4.2 | -4.3 |
| $b^*_{Re}$ | <0.0 & ≥-12.0 | -11.5 | -18.0 | -10.3 | -10.6 |
| $R_i(\%)$ | ≤15.0 | 10.2 | 10.5 | 8.4 | |
| $a^*_{Ri}$ | <0.0 | -2.5 | 5.1 | -3.9 | |
| $b^*_{Ri}$ | <0.0 & ≥-15.0 | -12.9 | -22.6 | -11.9 | |
| $L^*(Re60°)$ | | 46.8 | 49.1 | 45.9 | 46.4 |
| $a^*(Re60°)$ | | -0.3 | -2.1 | 0.1 | 0.1 |
| $b^*(Re60°)$ | | -4.2 | -0.9 | -3.4 | -2.3 |
| $L^*(Ri65°)$ | <15.0 | 15 | 18 | 12.2 | |
| $a^*(Ri65°)$ | | 31 | 37 | 44 | |
| $b^*(Ri65°)$ | | -30 | -27 | -19 | |

Fig. 6

MATERIAL COMPRISING A SUBSTRATE PROVIDED WITH A STACK WITH THERMAL PROPERTIES FOR HEAD-UP DISPLAY

The invention relates to a material, such as a glazing, comprising a transparent substrate coated with a stack of thin layers comprising several functional layers which can influence solar radiation and/or infrared radiation. The invention also relates to glazings comprising these materials and also to the use of such materials for manufacturing thermal insulation and/or solar protection glazings.

The invention relates more specifically to such a material for producing what are called "solar control" vehicle glazings, which make it possible to reduce the air-conditioning load and/or to prevent excessive overheating inside the passenger compartment of vehicles, while allowing what is called a "head-up" display or HUD.

The invention relates even more specifically to such a material for producing such glazings in which the solar control function is performed using a stack of thin layers comprising several metal functional layers, this stack exhibiting, throughout its thickness, a low electrical resistance such that the stack can be heated by applying an electric current available on board the vehicle, the current flowing transversely to the thickness of the stack.

Glazings, and in particular laminated glazings, comprising transparent substrates coated with a stack of thin layers comprising four metal functional layers, each arranged between two dielectric coatings, have been proposed in order to improve solar protection, and to obtain low sheet resistance, while retaining sufficient light transmission. These stacks are generally obtained by a sequence of depositions carried out by sputtering, optionally assisted by a magnetic field.

Materials of the prior art allow sufficiently high light transmission and low sheet resistance values to be obtained. The prior art teaches, from example 16 of international patent application no. WO 2005/051858, a material that makes it possible to produce a laminated glazing having a light transmission of 70.3% and a sheet resistance of 1.03 ohm/square.

However, there is a need for laminated glazings that have, as before, a light transmission of at least 70% but have a lower sheet resistance and above all an internal reflection that is compatible with a HUD display.

The complexity of stacks comprising three functional layers makes it difficult to improve these characteristics in combination.

The inventors have surprisingly discovered that, by selecting the thicknesses of the four functional layers, it is possible to obtain a material capable of exhibiting the desired properties.

The present invention is based on the use of a stack with four metal functional layers (that is to say a stack with exactly four metal functional layers, no more, no less) whose respective thicknesses, starting from the carrier substrate, are particular in that the second, third and fourth functional layers each have a thickness greater than that of the first layer but less than twice that of this first layer.

A first subject of the invention is a material as claimed in claim 1. This material comprises a transparent substrate coated on one face with a stack of thin layers successively comprising, from said face, an alternation:

of four functional metal layers based on silver or made of silver, denoted, starting from the substrate, first functional layer $Ag1$, second functional layer $Ag2$, third functional layer $Ag3$ and fourth functional layer $Ag4$, with physical thicknesses $Ea1$, $Ea2$, $Ea3$ and $Ea4$, respectively, and of five dielectric coatings denoted, starting from said face of the substrate, $M1$, $M2$, $M3$, $M4$ and $M5$, with optical thicknesses $Eo1$, $Eo2$, $Eo3$, $Eo4$ and $Eo5$, respectively, each dielectric coating comprising a dielectric layer or a dielectric assembly of layers, such that each functional metal layer is positioned between two dielectric coatings.

Said material is noteworthy in that:

the physical thickness $Ea1$ of the first functional layer $Ag1$ is less than the physical thickness $Ea2$ of the second functional layer $Ag2$, with $0.60<Ea1/Ea2<0.90$, or even $0.70 \leq Ea1/Ea2 \leq 0.85$, or even $0.75 \leq Ea1/Ea2 \leq 0.85$;

the physical thickness $Ea1$ of the first functional layer $Ag1$ is such that $8.00$ $Ea1$ $13.00$ nm, or even is such that $9.00 \leq Ea1 \leq 12.00$ nm;

the physical thickness $Ea1$ of the first functional layer $Ag1$ is less than the physical thickness $Ea3$ of the third functional layer $Ag3$, with $0.60<Ea1/Ea3<0.90$, or even $0.70 \leq Ea1/Ea3 \leq 0.85$, or even $0.75 \leq Ea1/Ea3 \leq 0.8$; and the physical thickness $Ea1$ of the first functional layer $Ag1$ is less than the physical thickness $Ea4$ of the fourth functional layer $Ag4$, with $0.60<Ea1/Ea4<0.90$, or even $0.70 \leq Ea1/Ea4 \leq 0.85$, or even $0.75 \leq Ea1/Ea4 \leq 0.85$.

This thus makes it possible to achieve the optical and thermal performance, transparency and aesthetic appearance which are desired, as explained previously.

This material is for HUD projector, and in particular for an s-polarized HUD projector. The material decreases the intensity of the color with s-polarization reflection) ($L^*$ (Ri65°<15.0); the material does not increase the intensity of the color with p-polarization reflection.

Some preferred but non-limiting embodiments of the present invention are given below as alternatives or in addition to one another:

the geometric thickness $Ea2$ of the second functional layer $Ag2$ is between 12.0 and 15.0 nm;

the geometric thickness $Ea3$ of the third functional layer $Ag3$ is between 13.0 and 16.0 nm;

the geometric thickness $Ea4$ of the fourth functional layer $Ag4$ is between 13.0 and 16.0 nm;

the cumulative geometric thickness of the four functional layers $Ag1$, $Ag2$, $Ag3$ and $Ag4$ is between 45.0 and 65.0 nanometers, and preferably is between 50.0 and 60.0 nanometers.

To achieve the target characteristics, it is preferable that:

the optical thickness $Eo1$ of the first dielectric coating $M1$ is less than the optical thickness $Eo2$ of the second dielectric coating $M2$, with $0.40<Eo1/Eo2<0.90$, or even $0.45 \leq Eo1/Eo2 \leq 0.85$;

the optical thickness $Eo1$ of the first dielectric coating $M1$ is less than the optical thickness $Eo3$ of the third dielectric coating $M3$, with $0.40<Eo1/Eo3<0.90$, or even $0.45 \leq Eo1/Eo3 \leq 0.85$;

the optical thickness $Eo1$ of the first dielectric coating $M1$ is less than the optical thickness $Eo4$ of the fourth dielectric coating $M4$, with $0.35<Eo1/Eo4<0.90$, or even $0.45 \leq Eo1/Eo4 \leq 0.85$; and the optical thickness $Eo5$ of the fifth dielectric coating $M5$ is such that $0.50<Eo1/Eo5<1.50$, or even $0.60 \leq Eo1/Eo5 \leq 1.30$.

To achieve the target characteristics, it can be preferable that:
the physical thickness Ea2 of the second functional layer Ag2 is such that $0.80 < Ea2/Ea3 < 1.20$, or even $0.90 \leq Ea2/Ea3 \leq 1.10$, or even $0.95 \leq Ea2/Ea3 \leq 1.05$; and
the physical thickness Ea2 of the second functional layer Ag2 is such that $0.80 < Ea2/Ea4 < 1.20$, or even $0.90 \leq Ea2/Ea4 \leq 1.10$, or even $0.95 \leq Ea2/Ea4 \leq 1.05$.

In addition, the physical thickness Ea3 of the third functional layer Ag3 is preferably such that $0.80 < Ea3/Ea4 < 1.20$, or even $0.90 \leq Ea3/Ea4 \leq 1.10$, or even $0.95 \leq Ea3/Ea4 \leq 1.05$.

In order to achieve in particular the desired colorimetric characteristics, it is preferable for each dielectric coating M1, M2, M3, M4 and M5 to comprise a high-index dielectric layer with a refractive index at the wavelength of 550 nm equal to or greater than 2.2, and preferably to comprise a high-index dielectric barrier layer, each of which is based on silicon and zirconium nitride.

The optical thickness of said high-index dielectric layer preferably constitutes between 20% and 75% of the optical thickness of the dielectric coating in which it is located, or even between 25% and 70% of the optical thickness of the dielectric coating in which it is located.

It can be preferred that:
the optical thickness Eo2 of the second dielectric coating M2 is close or identical to the optical thickness Eo3 of the third dielectric coating M3, with $0.80 < Eo2/Eo3 < 1.20$, or even $0.90 \leq Eo2/Eo3 \leq 1.10$;
the optical thickness Eo2 of the second dielectric coating M2 is close or identical to the optical thickness Eo4 of the fourth dielectric coating M4, with $0.80 < Eo2/Eo4 < 1.20$, or even $0.90 \leq Eo2/Eo4 \leq 1.10$; and
the optical thickness Eo2 of the second dielectric coating M2 is greater than the optical thickness Eo5 of the fifth dielectric coating M5, with $1.30 < Eo2/Eo5 < 2.00$, or even $1.40 \leq Eo2/Eo5 \leq 1.90$.

In one particular variant:
the optical thickness Eo3 of the third dielectric coating M3 is close or identical to the optical thickness Eo4 of the fourth dielectric coating M4, with $0.80 < Eo3/Eo4 < 1.20$, or even $0.90 \leq Eo3/Eo4 \leq 1.10$; and
the optical thickness Eo3 of the third dielectric coating M3 is greater than the optical thickness Eo5 of the fifth dielectric coating M5, with $1.20 < Eo3/Eo5 < 2.00$, or even $1.30 \leq Eo3/Eo5 \leq 1.90$.

In one very particular variant, the optical thickness Eo4 of the fourth dielectric coating M4 is greater than the optical thickness Eo5 of the fifth dielectric coating M5, with $1.20 < Eo4/Eo5 < 2.10$, or even $1.30 \leq Eo4/Eo5 \leq 1.90$.

Said four functional metal layers based on silver can be functional metal layers made of silver.

The stack can comprise, or consist of, starting from the transparent substrate:
a first dielectric coating M1 preferably comprising at least one dielectric layer having a barrier function and one dielectric layer having a wetting function,
a first functional layer Ag1,
optionally a blocking overlayer,
a second dielectric coating M2 preferably comprising at least one dielectric layer having a barrier function and one dielectric layer having a wetting function,
a second functional layer Ag2,
optionally a blocking overlayer,
a third dielectric coating M3 preferably comprising at least one dielectric layer having a barrier function and one dielectric layer having a wetting function,
a third functional layer Ag3,
optionally a blocking overlayer,
a fourth dielectric coating M4 preferably comprising at least one dielectric layer having a barrier function and one dielectric layer having a wetting function,
a fourth functional layer Ag4,
optionally a blocking overlayer,
a fifth dielectric coating M5 preferably comprising at least one dielectric layer having a barrier function.

The invention further relates to a glazing comprising at least one material as described above. Such a glazing is preferably in the form of laminated glazing.

A dielectric coating within the meaning of the invention preferably does not include any absorbent, metal or nitrided layer at all.

All of the light characteristics presented in the description are obtained according to the principles and methods described in the European standard EN 410 relating to the determination of the light and solar characteristics of glazings used in glass for the automotive industry.

Conventionally, the refractive indices are measured at a wavelength of 550 nm. The light transmission $T_L$ and light reflection $R_L$ factors are measured under illuminant A with a field of view of 2° or with illuminant D65 using the 10° observer according to the indications below.

Unless otherwise stated, the thicknesses mentioned in this document, without further details, are physical, or real or geometric, thicknesses denoted Ep for the dielectric layers and Ea for the functional metal layers and are expressed in nanometers. An optical thickness Eo of a layer or of an assembly of layers is defined as the physical thickness of the layer under consideration multiplied by its refractive index (n) at the wavelength of 550 nm: $Eo = n_{550} \times Ep$ or the sum of these optical thicknesses of the layers for this assembly of layers. As the refractive index is a dimensionless value, it can be considered that the unit of the optical thickness is the same as that chosen for the physical thickness. In the present description, the unit chosen for the thicknesses is the nanometer, unless otherwise indicated. If a dielectric coating is composed of several dielectric layers, the optical thickness of the dielectric coating corresponds to the sum of the optical thicknesses of the different dielectric layers constituting the dielectric coating.

Throughout the description, the substrate according to the invention is regarded as being positioned horizontally. The stack of thin layers is deposited above and in contact with the substrate. The meaning of the expressions "above" and "below" and "lower" and "upper" is to be considered with respect to this orientation. Unless specifically stipulated, the expressions "above" and "below" do not necessarily mean that two layers and/or coatings are positioned in contact with one another. VVhen it is specified that a layer is deposited "in contact" with another layer or with a coating, this means that there cannot be one (or more) layer(s) inserted between these two layers (or layer and coating).

For the purposes of the present invention, the labels "first", "second", "third", "fourth" and "fifth" for the functional layers or the dielectric coatings are defined starting from the substrate carrying the stack and with reference to the layers or coatings having the same function. For example, the closest functional layer to the substrate is the first functional layer, the following moving away from the substrate is the second functional layer, and so on.

Preferably, the stack is deposited by magnetic-field-assisted sputtering (magnetron process). According to this advantageous embodiment, all of the layers of the stack are deposited by magnetic-field-assisted sputtering.

Blocking layers can be present in the stack according to the invention. They conventionally have the role of protecting the functional layers from possible damage during the deposition of the upper antireflective coating and/or during a possible high-temperature heat treatment of the annealing, bending and/or tempering type.

The blocking layers are chosen, for example, from metal layers based on a metal or on a metal alloy, metal nitride layers, metal oxide layers and metal oxynitride layers of one or more elements chosen from titanium, nickel, chromium and niobium, such as Ti, TiN, $TiO_x$, Nb, NbN, Ni, NiN, Cr, CrN, NiCr or NiCrN or else $NbNO_x$ or $NiCrO_x$.

The geometric thickness of such layers is of the order of a few nanometers, generally less than 5 nanometers and most often approximately a nanometer or even less than a nanometer.

When these blocking layers are deposited in metal, nitride or oxynitride form, these layers can undergo a partial or complete oxidation according to their thickness and the nature of the layers which frame them, for example, during the deposition of the following layer or by oxidation in contact with the underlying layer.

According to advantageous embodiments of the invention, the dielectric coatings satisfy one or more of the following conditions:
  the dielectric coatings comprise at least one dielectric layer based on an oxide or on a nitride of one or more elements chosen from silicon, titanium, zirconium, aluminum, tin or zinc, and/or
  at least one dielectric coating comprises at least one dielectric layer having a barrier function, and/or
  each of the dielectric coatings comprises at least one dielectric layer having a barrier function, and/or
  the dielectric layers having a barrier function are based on compounds of silicon and/or of aluminum chosen from oxides, such as $SiO_2$ and $Al_2O_3$ or their mixture, silicon nitrides $Si_3N_4$ and AlN or their mixture, and oxynitrides $SiO_xN_y$ and $AlO_xN_y$ or their mixture, and/or
  the dielectric layers having a barrier function are based on compounds of silicon and/or aluminum optionally comprise at least one other element, such as aluminum, hafnium and zirconium, and/or at least one dielectric coating comprises at least one dielectric layer having a stabilizing function, and/or
  each dielectric coating comprises at least one dielectric layer having a stabilizing function, and/or
  the dielectric layers having a stabilizing function are preferably based on an oxide chosen from zinc oxide, tin oxide, zirconium oxide or a mixture of at least two thereof,
  the dielectric layers having a stabilizing function are preferably based on crystalline oxide, in particular based on zinc oxide, optionally doped using at least one other element, such as aluminum, and/or
  each functional layer is above a dielectric coating, the upper layer of which is a dielectric layer having a stabilizing function, preferably based on zinc oxide, and/or below a dielectric coating, the lower layer of which is a dielectric layer having a stabilizing function, preferably based on zinc oxide.

Preferably, each dielectric coating consists solely of one or more dielectric layers. Preferably, there is thus no absorbing layer in the dielectric coatings, in order not to reduce the light transmission.

The stacks of the invention can comprise dielectric layers having a barrier function. The expression "dielectric layers having a barrier function" is understood to mean a layer made of a material capable of forming a barrier to the high-temperature diffusion of water and oxygen, originating from the ambient atmosphere or from the transparent substrate, toward the functional layer. The constituent materials of the dielectric layer having a barrier function thus must not undergo chemical or structural modification at high temperature which would result in a modification of their optical properties. The layer or layers having a barrier function are preferably also chosen such that they are made of a material capable of forming a barrier to the constituent material of the functional layer. The dielectric layers having a barrier function thus make it possible for the stack to undergo, without excessively great optical change, heat treatments of the annealing, tempering or bending type.

The stacks of the invention can comprise dielectric layers having a stabilizing function. For the purposes of the invention, the term "stabilizing" means that the nature of the layer is selected so as to stabilize the interface between the functional layer and this layer. This stabilization results in the strengthening of the adhesion of the functional layer to the layers which frame it and, in fact, it will oppose the migration of its constituent material.

The dielectric layer or layers having a stabilizing function can be directly in contact with a functional layer or separated by a blocking layer.

Preferably, the final dielectric layer of each dielectric coating located below a functional layer is a dielectric layer having a stabilizing function. This is because it is advantageous to have a layer having a stabilizing function, for example based on zinc oxide, below a functional layer as it facilitates the adhesion and the crystallization of the silver-based functional layer and increases its quality and its stability at high temperature.

It is also advantageous to have a layer having a stabilizing function, for example based on zinc oxide, above a functional layer in order to increase the adhesion thereof and to optimally oppose the diffusion on the side of the stack opposite the substrate.

The dielectric layer or layers having a stabilizing function can thus be found above and/or below at least one functional layer or each functional layer, either directly in contact therewith or separated by a blocking layer.

Advantageously, each dielectric layer having a barrier function is separated from a functional layer by at least one dielectric layer having a stabilizing function.

This dielectric layer having a stabilizing function can have a thickness of at least 4 nm, in particular a thickness of between 4 and 18 nm and better still of 8 to 15 nm.

The transparent substrates according to the invention are preferably made of a rigid inorganic material, such as made of glass, or are organic, based on polymers (or made of polymer).

The transparent organic substrates according to the invention, which are rigid or flexible, can also be made of polymer. Examples of polymers suitable according to the invention comprise, in particular:
  polyethylene;
  polyesters, such as polyethylene terephthalate (PET), polybutylene terephthalate (PBT) or polyethylene naphthalate (PEN);
  polyacrylates, such as polymethyl methacrylate (PMMA);
  polycarbonates;
  polyurethanes;
  polyamides;
  polyimides;
  fluoropolymers, such as fluoroesters, for example ethylene-tetrafluoroethylene (ETFE), polyvinylidene fluoride (PVDF), polychlorotrifluoroethylene (PCTFE), ethylene-chlorotrifluoroethylene (ECTFE) or fluorinated ethylene-propylene (FEP) copolymers; photocrosslinkable and/or photopolymerizable resins, such as thiolene, polyurethane, urethane-acrylate or polyester-acrylate resins; and polythiourethanes.

The substrate is preferably a sheet of glass.

The substrate is preferably transparent, colorless (it is then a clear or extra-clear glass) or colored, for example blue, gray or bronze. The glass is preferably of soda-lime-silica type but it can also be a glass of borosilicate or aluminoborosilicate type.

The substrate advantageously has at least one dimension greater than or equal to 1 m, or even 2 m and even 3 m. The thickness of the substrate generally varies between 0.6 mm and 2.1 mm. The substrate can be flat or curved.

The material, that is to say the substrate coated with the stack, can undergo a high-temperature heat treatment, such as an annealing, for example by a flash annealing, such as a laser or flame annealing, a tempering and/or a bending. The temperature of the heat treatment is greater than 400° C., preferably greater than 450° C. and better still greater than 500° C. The substrate coated with the stack can thus be curved and/or tempered.

The glazing of the invention is preferably in the form of laminated glazing and is in particular a laminated glazing for a HUD projector. A laminated glazing comprises at least one structure of first substrate/sheet(s)/second substrate type. The stack of thin layers is positioned on one at least of the faces of one of the substrates. The stack can be on the face of the first substrate in contact with the sheet, preferably polymer.

The glazing according to the invention, used as laminated glazing, preferably has the following optical characteristics:
a light transmission equal to or greater than 70%,
$a^*_T < 0.0$
an external and internal reflection, each equal to or less than 15%
$a^*_{Re} < 0.0$, $-12.0 \leq b^*_{Re} < 0.0$,
$a^*_{Ri} < 0.0$, $-15.0 \leq b^*_{Ri} < 0.0$,
and $L^*(Ri65°) < 15.0$ within the meaning of this document.

The details and advantageous features of the invention become apparent from the following non-limiting examples, illustrated using the appended figures.

Figure 1:
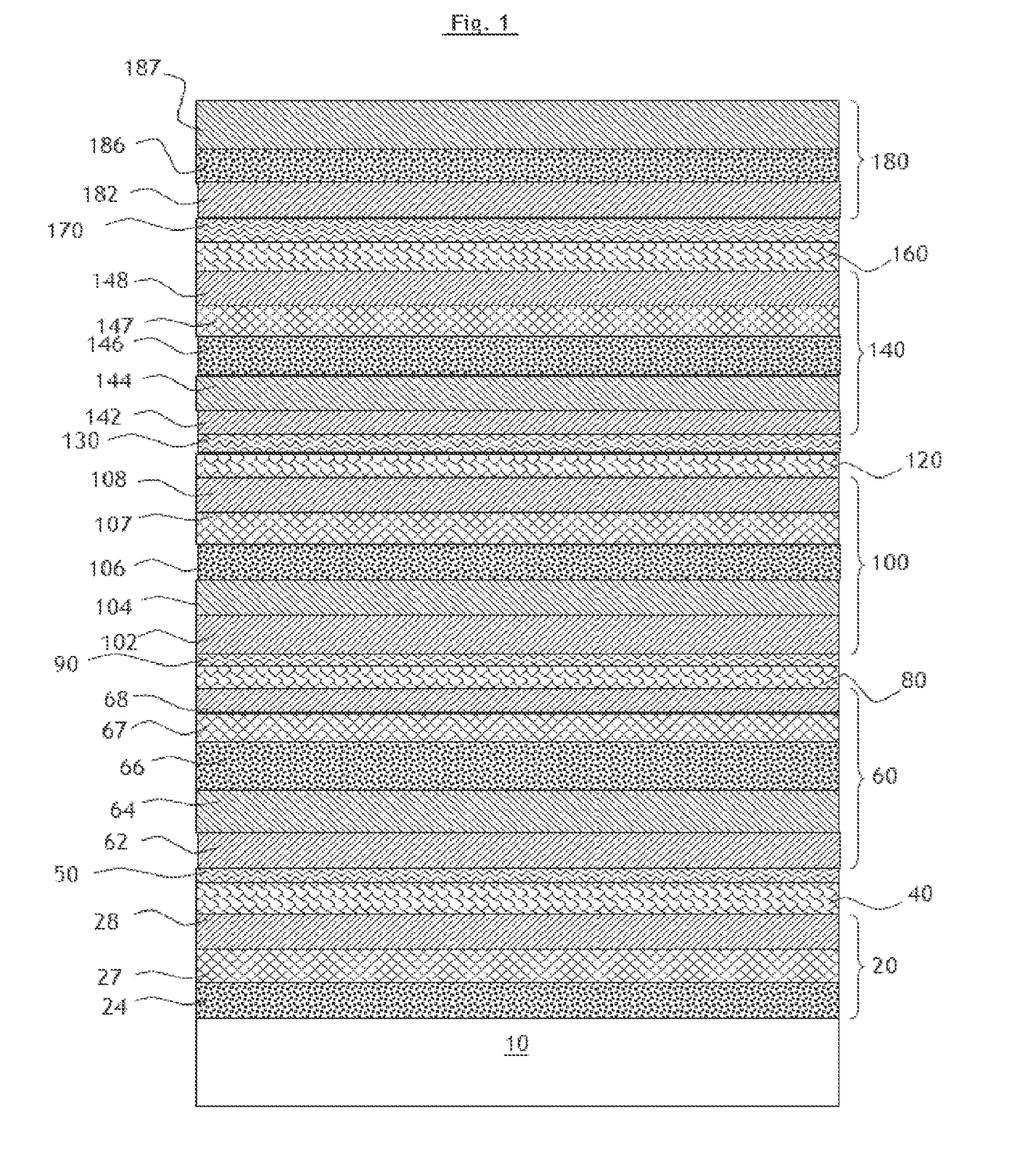
FIG. 1 illustrates a stack structure according to the invention with four functional metal layers, this structure being deposited on a transparent glass substrate 10.

The proportions between the various elements are not observed in FIG. 1 in order to make reading easier.

The stack illustrated in FIG. 1 is arranged on a substrate 10 and comprises only four functional metal layers 40, 80, 120, and 160. Each functional layer 40, 80, 120, 160 is arranged between two dielectric coatings 20, 60, 100, 140 and 180 such that:

the first functional layer 40 starting from the substrate 10 is arranged between the dielectric coatings 20 and 60,
the second functional layer 80 is arranged between the dielectric coatings 60 and 100,
the third functional layer 120 is arranged between the dielectric coatings 100 and 140, and
the fourth functional layer 160 is arranged between the dielectric coatings 140 and 180.

These dielectric coatings 20, 60, 100, 140, 180 each comprise at least one dielectric layer 24, 27, 28; 62, 64, 66, 67, 68; 102, 104, 106, 107, 108; 142, 144, 146, 147, 148, 182, 186 and 187.

The stack can also comprise:
blocking overlayers 50, 90, 130 and 170, each located on and in contact with a functional layer,
blocking underlayers (not illustrated) each located under and in contact with a functional layer,
a protective layer (not illustrated), the last layer located above all of the previous layers, for example made of TiZr or of zirconium and titanium oxide.

EXAMPLES

I. Preparation of the Substrates: Stacks, Deposition Conditions and Heat Treatments The stacks of thin layers defined below are deposited on substrates made of clear soda-lime glass with a thickness of 1.6 mm.

In the examples, the layers were deposited by sputtering (what is called "magnetron cathode sputtering"):

the functional layers 40, 80, 120 and 160 are layers of silver (Ag), deposited from a metal target in an atmosphere of 100% argon or krypton and a reduced pressure of $3.10^{-3}$ mbar, the blocking overlayers 50, 90, 130 and 170 are metal layers made of an alloy of nickel and chromium (NiCr), deposited from a metal target with 80 atom % of Ni and 20 atom % of Cr, in an atmosphere of 100% argon and a reduced pressure of $3.10^{-3}$ mbar, the dielectric layers are:
medium-index barrier layers 104, 144 and 187, which are each based on silicon nitride, doped with aluminum ("Si$_3$N$_4$") and which are deposited from a silicon target at 92% by weight of silicon and 8% by weight of aluminum, in an atmosphere of nitrogen and argon at 45% nitrogen and 55% argon and a reduced pressure of $3.2.10^{-3}$ mbar, high-index barrier layers 24, 64, 106, 146 and 186, which are each based on silicon and zirconium nitride ("SiZrN"), and which are deposited from a silicon target at 83 atom % of silicon and 17 atom % of zirconium, in an atmosphere of nitrogen and argon at 45% nitrogen and 55% argon and a reduced pressure of $3.2.10^{-3}$ mbar, a very-high-index barrier layer 66, which is based on silicon and zirconium nitride ("SiZrN*"), and which is deposited from a silicon target with 73 atom % of silicon and 27 atom % of zirconium, in an atmosphere of nitrogen and argon at 45% nitrogen and 55% argon and a reduced pressure of $3.2.10^{-3}$ mbar, wetting layers 28, 68, 108 and 148, which are each located under and in contact with each metal functional layer and which are each made of zinc oxide ("ZnO") deposited from a ceramic target in an atmosphere at 100% argon and a pressure of $3.10^{-3}$ mbar, smoothing layers 27, 67, 107 and 147, which are each located between a barrier layer and a wetting layer and which are each made of mixed oxide of zinc and tin ("SnZnO") deposited from a metal target at 50% by weight of tin and 50% by weight of zinc, in an atmosphere of 30% argon and 70% oxygen and a reduced pressure of $3.10^{-3}$ mbar, stabilizing layers 62, 102, 142 and 182, which are each located on and in contact with a blocking overlayer and which are each made of zinc oxide doped with aluminum ("ZnO") deposited from a ceramic target in an atmosphere of 100% argon and a reduced pressure of $3.10^{-3}$ mbar.

Figure 2:
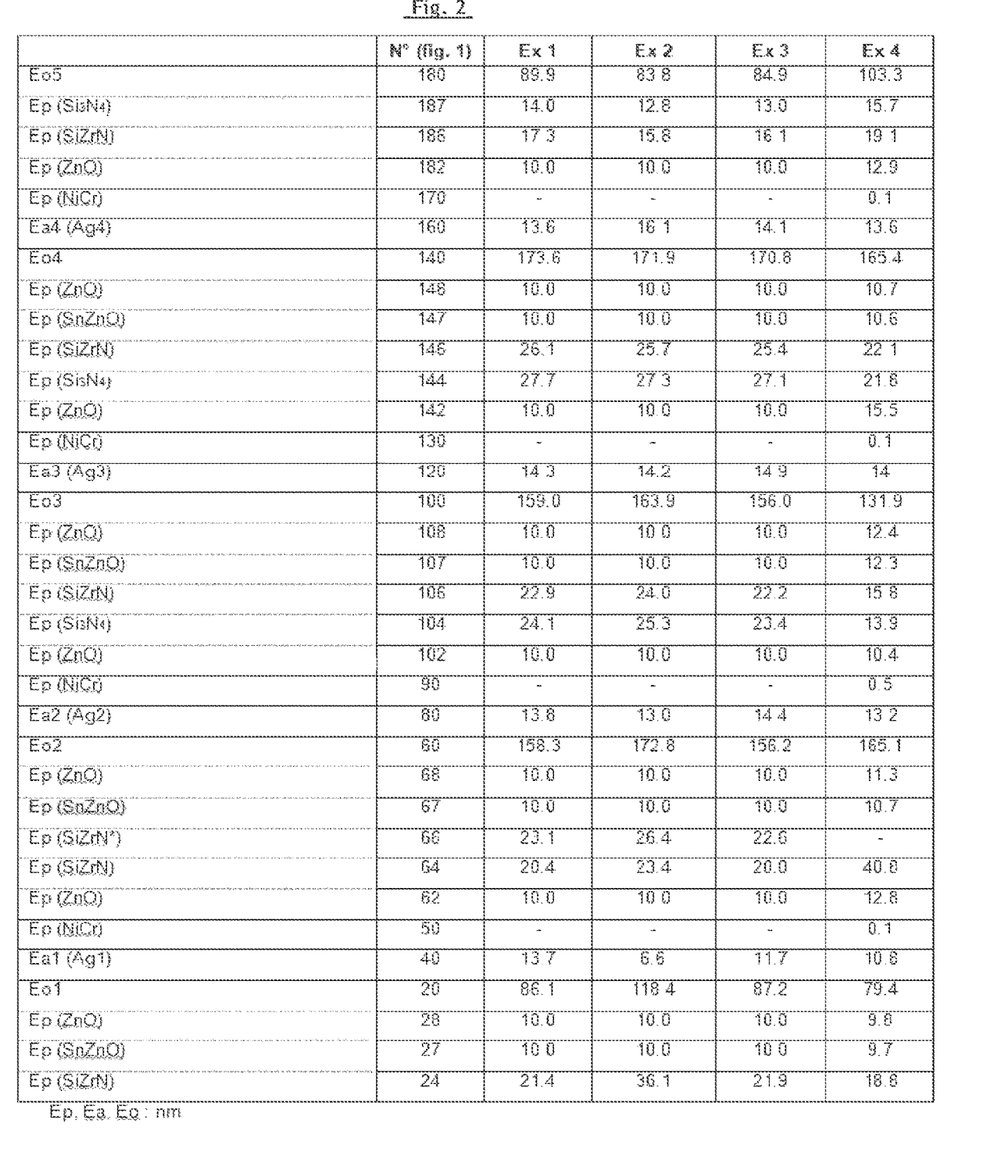
FIG. 2 details the composition of four examples, numbered 1 to 4, in conjunction with FIG. 1.

The table of FIG. 2 thus lists the materials and physical thicknesses Ep of each dielectric layer, the thicknesses Ea in nanometers of each metal functional layer and the corresponding optical thickness Eo (in nanometers) of each dielectric coating according to their position with respect to the substrate carrying the stack (located at the very bottom of the table).

Columns 11, 12 and 13 respectively set out the ratios for the invention, the preferred ratios and the even more preferred ratios.

II. "Solar Control" and Colorimetry Performance Qualities

Figure 4:
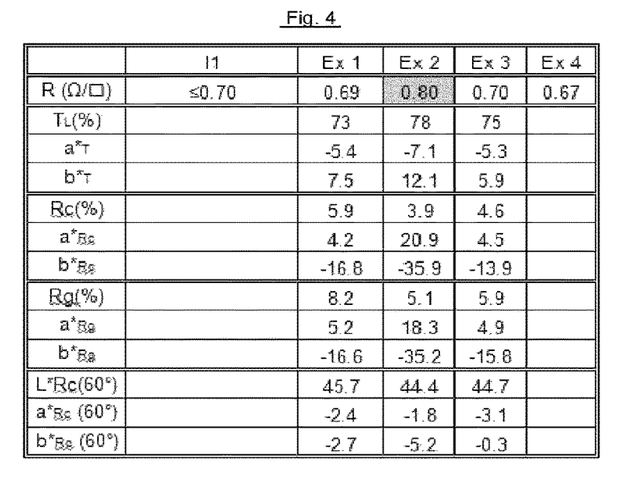
FIG. 4 presents the sheet resistance and optical characteristics in monolithic configuration, after annealing heat treatment.

The table of FIG. 4 sets out the main optical characteristics measured in the monolithic state, after an annealing treatment at 650° C. for 5 minutes and cooling in ambient air (20° C.).

For these monolithic configurations:

TL indicates: the light transmission in the visible region in %, measured under illuminant A with the 2° observer;

$a^*_T$ and $b^*_T$ indicate the colors at normal incidence (0°) in transmission a* and b* in the L*a*b* system measured with illuminant D65 with the 10° observer and measured perpendicular to the substrate;

Rc indicates: the light reflection in the visible in %, measured with illuminant A with the 10° observer on the side of the stack;

$a^*_{Rc}$ and $b^*_{Rc}$ indicate the colors at normal incidence (0°) in reflection a* and b* in the L*a*b* system measured with illuminant D65 with the 10° observer on the side of the stack and thus measured perpendicular to the substrate;

Rg indicates: the light reflection in the visible in %, measured with illuminant A with the 2° observer on the side opposite the stack (under the substrate 10);

$a^*_{Rg}$ and $b^*_{Rg}$ indicate the colors at normal incidence (0°) in reflection a* and b* in the L*a*b* system measured with illuminant D65 with the 10° observer on the side opposite the stack and thus measured perpendicular to the substrate;

L*Rc(60°), $a^*_{Rc}$(60°) and $b^*_{Rc}$(60°) indicate the intensity L* and the colors a* and b* in reflection on the side of the layer in the L*a*b* system measured at an incidence of 60° with respect to the normal with illuminant D65 with the 10° observer on the side of the stack.

Figure 5:
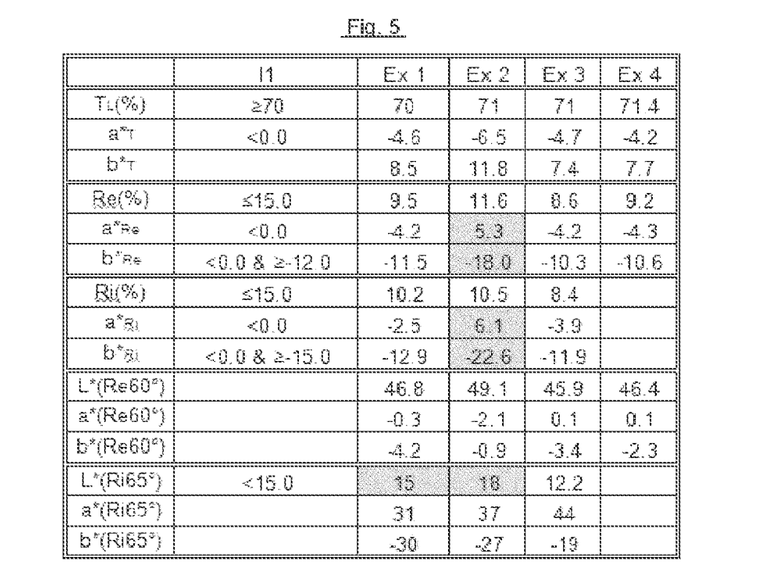
FIG. 5 presents optical characteristics in laminated configuration.

The table of FIG. 5 lists the main optical characteristics measured when the coated substrates of the stacks each form part of a laminated glazing with the structure: 1.6 mm glass interior substrate/0.76 mm PVB interlayer sheet/2.1 mm glass exterior substrate, the stack being positioned on the face of the interior substrate which is turned toward the interlayer sheet.

Figure 6:
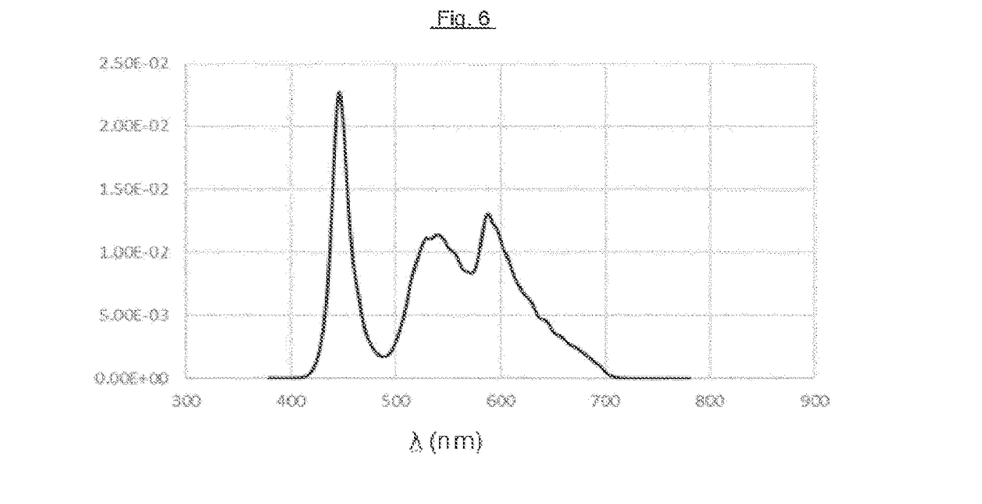
FIG. 6 presents the reference white used for the conversion of the quantities X, Y, Z into L*, a*, b* as a function of the wavelength λ, in nanometers.

For these laminated glazings,

TL indicates: the light transmission in the visible region in %, measured under illuminant A with the 2° observer;

$a^*_T$ and $b^*_T$ indicate the colors at normal incidence (0°) in transmission a* and b* in the L*a*b* system, measured with illuminant D65 with the 10° observer and measured perpendicular to the glazing;

Re indicates: the light reflection in the visible region in %, measured with illuminant A with the 2° observer on the side of the outermost face of the glazing;

$a^*_{Re}$ and $b^*_{Re}$ indicate the colors at normal incidence (0°) in reflection a* and b* in the L*a*b* system, measured with illuminant D65 with the 10° observer on the side of the outermost face and thus measured perpendicular to the glazing;

Ri indicates: the light reflection in the visible region in %, measured with illuminant D65 with the 2° observer on the side of the interior face of the glazing;

$a^*_{Ri}$ and $b^*_{Ri}$ indicate the colors at normal incidence (0°) in reflection a* and b* in the L*a*b* system measured with illuminant D65 with the 10° observer on the side of the interior face and thus measured perpendicular to the substrate;

L*(Re60°), a*(Re60°) and b*(Re60°) indicate the colors a* and b* in reflection in the L*a*b* system measured at an incidence of 60° with respect to the normal with illuminant D65 with the 2° observer on the side of the exterior face of the glazing; and L*(Ri65°), a*(Ri65°) and b*(Ri65°) indicate the colors a* and b* in reflection in the L*a*b* system measured at an incidence of 65° with respect to the normal: On the laminated glazing, the colors L*(Ri65°), a*(Ri65°) and b*(Ri65° are measured with s-polarization and at an incidence of 65° with respect to the normal, corresponding to the second reflection starting from the interior face of the glazing (the first reflection being that measured directly on the innermost face). The illuminant used for this measurement corresponds to a HUD projector (to measure the quantities X, Y, Z which are then converted into L*, a*, b* using a reference white corresponding to illuminant D65 with the 2° observer); the chosen illuminant is illustrated in FIG. 6.

The values targeted all at the same time by the invention are indicated in column 11 of the tables of FIGS. 4 and 5.

Examples 1 and 2 are comparative examples outside the invention. Examples 3 and 4 are examples according to the invention.

Figure 3:
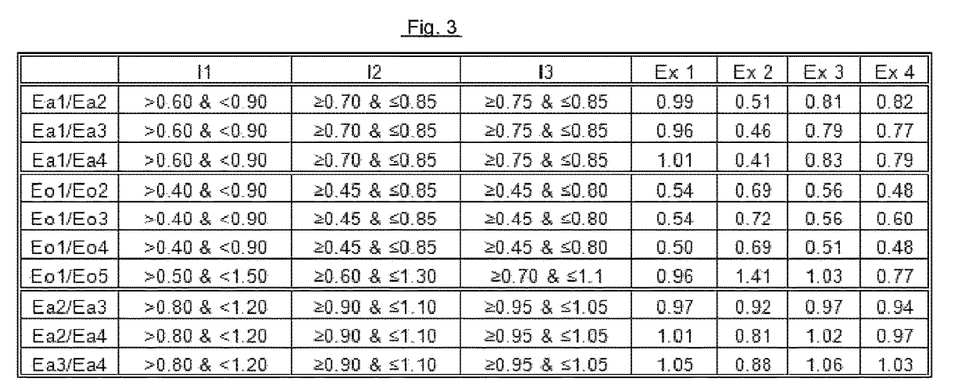
FIG. 3 summarizes specific ratios of optical thicknesses Eo or of physical thickness Ea.

Example 1 follows the general teaching of international patent application no. WO 2005/051858 since it comprises four functional layers of substantially identical thicknesses, all of the order of 14.0 nm plus or minus 0.5 nm. The thickness of the first functional layer to the thickness of each of the others is therefore of the order of 1.00 plus or minus 0.05, as can be seen in the first three rows of the table of FIG. 3. These thicknesses are not strictly identical because this example 1 was the subject of an optimization in order to try to achieve the highest possible light transmission while achieving a satisfactory low sheet resistance, that is to say of the order of 0.70 ohm per square or less.

The table of FIG. 4 shows that this monolithic light transmission is 73% and the table of FIG. 5 shows that this laminated light transmission is 70%, which is satisfactory.

However, this table of FIG. 5 shows that the intensity of the color in reflection of the HUD image, expressed by L*(Ri65°), is too high. This glazing is incompatible for use with a HUD system.

Example 2 follows another general teaching and comprises a very thin first functional layer and the following three being substantially identical. The thickness of the first functional layer to the thickness of each of the others is of the order of 0.50 plus or minus 0.05, as can be seen in the first three rows of the table of FIG. 3. This example 2 was also the subject of an optimization to try to achieve the highest possible light transmission, but the sheet resistance obtained is not satisfactory: it is too far above the maximum limit of 0.70 ohm per square set to allow efficient electric heating of the glazing via the stack of thin layers.

Furthermore, the table of FIG. 5 shows that the laminated light transmission is 71%, which is satisfactory, but that the intensity of the color in reflection of the HUD image, expressed by $L^*(Ri65°)$, is also too high.

In addition, the table of FIG. 5 shows that the color in internal reflection is far from the target values with $a^*_{Ri}$ much higher than zero and too positive and $b^*_{Ri}$ much lower than zero and too negative; the color in external reflection is also far from the target values, $a^*_{Re}$ much higher than zero and too positive and $b^*_{Re}$ much lower than zero and too negative.

According to the invention, it is possible to produce a glazing comprising a stack with three metal functional layers which, in laminated configuration, exhibits a light transmission equal to or greater than 70%, $a^*_T<0.0$, an external and internal reflection both equal to or less than 15%, $a^*_{Re}<0.0$, $-12.0 \leq b^*_{Re}<0.0$, $a^*_{Ri}<0.0$, $-15.0 \leq b^*_{Ri}<0.0$ and $L^*(Ri65°)<15.0$.

Examples 3 and 4 are thus satisfactory. They exhibit a pleasant and very weak coloration in transmission, preferably in the blue or blue-green range but of very low intensity.

The invention claimed is:

1. A material comprising a transparent substrate coated on one face with a stack of thin layers successively comprising, from said face, an alternation:
    of four functional metal layers based on silver or made of silver, denoted, starting from the substrate, first functional layer Ag1, second functional layer Ag2, third functional layer Ag3 and fourth functional layer Ag4, with physical thicknesses Ea1, Ea2, Ea3 and Ea4, respectively,
    of five dielectric coatings denoted, starting from said face of the substrate, M1, M2, M3, M4 and M5, with optical thicknesses Eo1, Eo2, Eo3, Eo4 and Eo5, respectively, each dielectric coating comprising a dielectric layer or a dielectric assembly of layers,
    such that each functional metal layer is positioned between two dielectric coatings,
    wherein:
    the physical thickness Ea1 of the first functional layer Ag1 is less than the physical thickness Ea2 of the second functional layer Ag2, with $0.60<Ea1/Ea2<0.90$;
    the physical thickness Ea1 of the first functional layer Ag1 is such that $8.00 \leq Ea1 \leq 13.00$ nm;
    the physical thickness Ea1 of the first functional layer Ag1 is less than the physical thickness Ea3 of the third functional layer Ag3, with $0.60<Ea1/Ea3<0.90$; and
    the physical thickness Ea1 of the first functional layer Ag1 is less than the physical thickness Ea4 of the fourth functional layer Ag4, with $0.60<Ea1/Ea4<0.90$.

2. The material as claimed in claim 1, wherein:
    the optical thickness Eo1 of the first dielectric coating M1 is less than the optical thickness Eo2 of the second dielectric coating M2, with $0.40<Eo1/Eo2<0.90$;
    the optical thickness Eo1 of the first dielectric coating M1 is less than the optical thickness Eo3 of the third dielectric coating M3, with $0.40<Eo1/Eo3<0.90$;
    the optical thickness Eo1 of the first dielectric coating M1 is less than the optical thickness Eo4 of the fourth dielectric coating M4, with $0.35<Eo1/Eo4<0.90$; and
    the optical thickness Eo1 of the fifth dielectric coating M5 is such that $0.50<Eo1/Eo5<1.50$.

3. The material as claimed in claim 1 or 2, wherein:
    the physical thickness Ea2 of the second functional layer Ag2 is such that $0.80<Ea2/Ea3<1.20$; and
    the physical thickness Ea2 of the second functional layer Ag2 is such that $0.80<Ea2/Ea4<1.20$.

4. The material as claimed in claim 1, wherein the physical thickness Ea3 of the third functional layer Ag3 is such that $0.80<Ea3/Ea4<1.20$.

5. The material as claimed in claim 1, wherein each dielectric coating M1, M2, M3, M4 and M5 comprises a high-index dielectric layer with a refractive index at the wavelength of 550 nm equal to or greater than 2.2, which are each based on silicon and zirconium nitride.

6. The material as claimed in claim 5, wherein the optical thickness of said high-index dielectric layer constitutes between 25% and 75% of the optical thickness of the dielectric coating in which it is located.

7. The material as claimed in claim 1, wherein
    the optical thickness Eo2 of the second dielectric coating M2 is close or identical to the optical thickness Eo3 of the third dielectric coating M3, with $0.80<Eo2/Eo3<1.20$;
    the optical thickness Eo2 of the second dielectric coating M2 is close or identical to the optical thickness Eo4 of the fourth dielectric coating M4, with $0.80<Eo2/Eo4<1.20$; and
    the optical thickness Eo2 of the second dielectric coating M2 is greater than the optical thickness Eo5 of the fifth dielectric coating M5, with $1.30<Eo2/Eo5<2.00$.

8. The material as claimed in claim 1, wherein
    the optical thickness Eo3 of the third dielectric coating M3 is close or identical to the optical thickness Eo4 of the fourth dielectric coating M4, with $0.80<Eo3/Eo4<1.20$; and
    the optical thickness Eo3 of the third dielectric coating M3 is greater than the optical thickness Eo5 of the fifth dielectric coating M5, with $1.20<Eo3/Eo5<2.00$.

9. The material as claimed in claim 1, wherein
    the optical thickness Eo4 of the fourth dielectric coating M4 is greater than the optical thickness Eo5 of the fifth dielectric coating M5, with $1.20<Eo4/Eo5<2.10$.

10. A glazing comprising at least one of the material as claimed in claim 1.

11. The material as claimed in claim 1, wherein:
    $0.70 \leq Ea1/Ea2 \leq 0.85$;
    $9.00 \leq Ea1 \leq 12.00$ nm;
    $0.70 \leq Ea1/Ea3 \leq 0.85$; and
    $0.70 \leq Ea1/Ea4 \leq 0.85$.

12. The material as claimed in claim 2, wherein:
    $0.45 \leq Eo1/Eo2 \leq 0.85$;
    $0.45 \leq Eo1/Eo3 \leq 0.85$;
    $0.45 \leq Eo1/Eo4 \leq 0.85$; and
    $0.60 \leq Eo1/Eo5 \leq 1.30$.

13. The material as claimed in claim 3, wherein:
    $0.90 \leq Ea2/Ea3 \leq 1.10$; and
    $0.90 \leq Ea2/Ea4 \leq 1.10$.

14. The material as claimed in claim 4, wherein $0.90 \leq Ea3/Ea4 \leq 1.10$.

15. The material as claimed in claim 5, wherein each dielectric coating M1, M2, M3, M4 and M5 comprises a high-index dielectric barrier layer.

16. The material as claimed in claim 7, wherein
    $0.90 \leq Eo2/Eo3 \leq 1.10$;
    $0.90 \leq Eo2/Eo4 \leq 1.10$; and
    $1.40 \leq Eo2/Eo5 \leq 1.90$.

17. The material as claimed in claim 8, wherein
0.90≤ Eo3/Eo4≤1.10; and
1.30≤Eo3/Eo5≤1.90.

18. The material as claimed in claim 9, wherein 1.30≤ Eo4/Eo5≤1.90.

19. The glazing as claimed in claim 10, wherein said glazing is a laminated glazing.

20. The glazing as claimed in claim 10, wherein said glazing is a laminated glazing for a HUD projector.

* * * * *